Jan. 18, 1938.  D. CURRIE  2,105,585
WAGON HITCH
Filed May 10, 1937
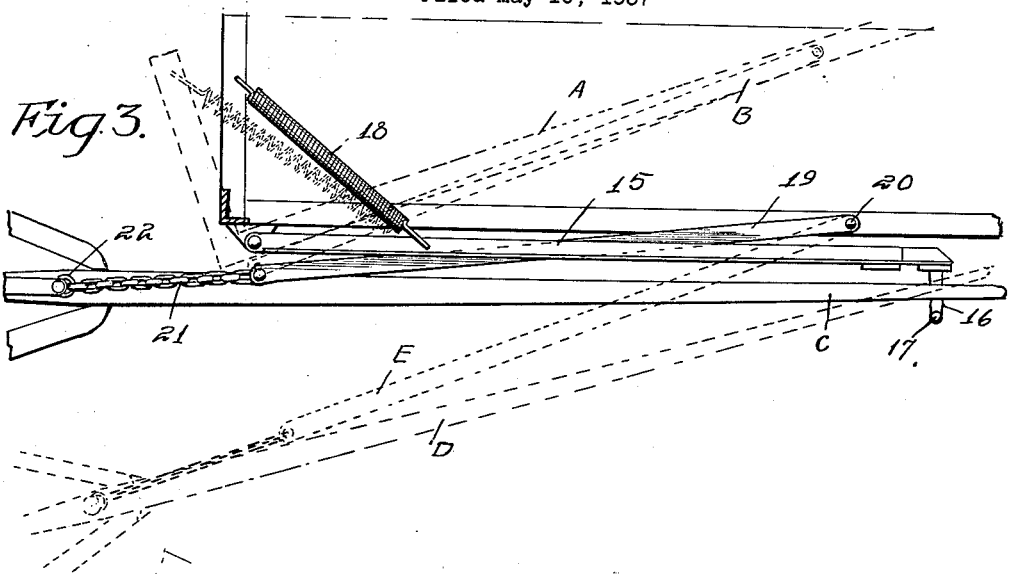
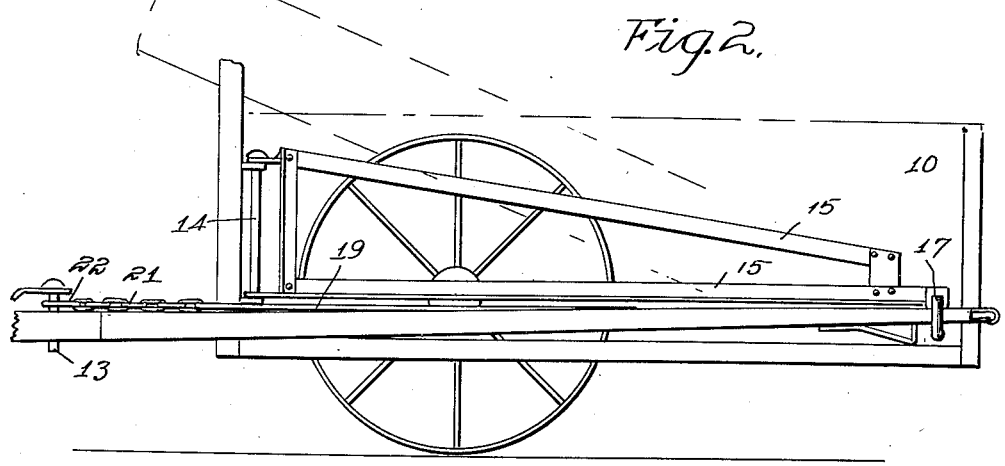
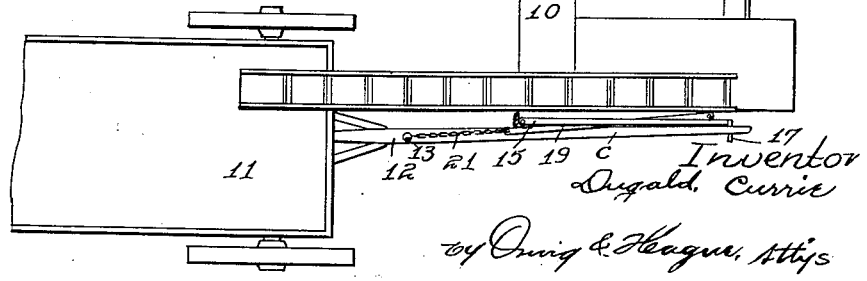
Inventor
Dugald Currie
by Orwig & Hague, Attys Patented Jan. 18, 1938

2,105,585

UNITED STATES PATENT OFFICE 2,105,585

WAGON HITCH

Dugald Currie, Des Moines, Iowa

Application May 10, 1937, Serial No. 141,667

4 Claims. (Cl. 280—33.44)

In connection with the use of tractor drawn farm implements such as corn harvesters it is customary to connect a wagon alongside the corn harvester into which the ears of corn are delivered from the harvester.

The object of my invention is to provide a wagon tongue hitch device of simple, durable and inexpensive construction whereby the operator may readily, quickly and easily connect the wagon tongue to the implement so that the wagon will be advanced in the rear of the implement and the wagon tongue supported under all conditions of use.

More specifically, it is my object to provide a hitch device of this class in which all strains and stresses upon the wagon tongue to which it might be subjected when the implement is moved laterally, as when turning around at the end of a field, are avoided, and all the pulling strains upon the wagon tongue are applied direct from the implement to the pivot pin at the rear of the wagon tongue.

In the accompanying drawing Figure 1 shows a top or plan view of an implement such as a corn harvester, and a wagon with my improved wagon tongue hitch device applied thereto.

Figure 2 shows a side elevation of a portion of a corn harvester and a wagon tongue and my improved wagon tongue hitch applied thereto; and Figure 3 shows a top or plan view of a portion of a farm implement and a wagon tongue with my improved wagon tongue hitch applied thereto. The dotted lines show the wagon tongue hitch device in various positions hereinafter specified.

Referring to the accompanying drawing I have used the reference numeral 10 to indicate generally that portion of a corn harvester shown, and 11 indicates a wagon having a tongue 12 and a tongue pivot pin 13, all of ordinary construction.

Applied to one side of the implement 10 is a pivot pin 14 arranged in upright position. Pivotally mounted on this pivot pin is the wagon tongue supporting arm 15 which normally extends forwardly alongside the implement and is capable of having its forward end swing outwardly away from the implement in a horizontal plane. At the forward end of the supporting arm 15 is a wagon tongue supporting bracket 16, preferably having an upwardly extended hooked end 17. A spring 18 is attached to one end of said arm with the other end attached to a part of the implement for applying a yielding pressure to the arm for normally holding it in its position parallel with the side of the implement.

The draft member comprises the draft bar 19 pivotally connected at 20 to the implement, or other means for advancing the wagon, and extended rearwardly alongside the implement and capable of having its rear end move toward and from the implement. This bar is extended to a point adjacent the rear end of the implement, and at that point a chain 21 is attached to the rear end of the bar and provided at its rear end with a ring 22 designed to receive the pivot pin 13.

In practical operation the wagon is driven alongside the implement, the draft animals unhitched and the front end of the tongue placed in position resting in the bracket 16. The wagon tongue pivot pin is then withdrawn and extended through the ring 23 and replaced. This simple operation obviously may be quickly, readily and easily performed. While the implement is being advanced along a straight line the wagon tongue rests on the bracket 16 and the wagon is advanced in the rear of the implement. All of the strains applied for advancing the wagon are applied through the draw bar 19 and chain 21. When the implement is turned toward the left during its advance movement, and if the tongue were held in its position parallel with the side of the implement, then an excessive strain would be applied to the rear portion of the tongue where it engaged the side of the implement. When this occurs, with our improved device the forward end of the tongue swings toward the right against the pressure of the spring 18, thereby avoiding all excessive strains which might otherwise be applied to the tongue tending to break it. In Figure 3 of the drawing the dotted lines A indicate the position of the side of the implement when turning toward the left; the dotted lines B indicate the position of the draw bar and illustrate that, at the point where the forward end of the chain 21 connects with the draw bar 19, there is a pivotal movement which avoids excessive strains that might otherwise be thrown upon the draw bar.

In this same position the solid lines at C indicate the position that the wagon tongue would assume upon the turning of the implement toward the left, and this illustrates that no strains or stresses are applied to the tongue during such turning movement.

When, however, the implement is turned toward the right during its advance, then the spring 18 holds the front of the wagon tongue adjacent the side of the implement, but the rear end of the tongue and the draft bar will be moved away from the rear of the implement. This position is illustrated in Figure 3 by the dotted lines D, indicating the position of the tongue, E, the position of the draft bar. It is assumed in this illustration that the implement shown by solid lines in said figure has been turned toward the right during its advance.

From the foregoing it will be seen that my improved wagon tongue hitch may be used to advance the wagon in the rear of the implement with the wagon tongue lying close alongside the side of the implement, and that all of the strains and stresses necessary to advance the wagon are carried by the draft bar and that when turning, no strains are thrown upon the wagon tongue nor upon the draft bar which might tend to break or injure them.

I claim as my invention:

1. A wagon hitch for use in connecting a wagon having a tongue, to an implement to be advanced, comprising a wagon tongue supporting arm having a tongue supporting member at its forward portion, means for pivoting its rear end portion to an implement so that its forward end may move laterally from position substantially parallel with the side of an implement, to position extended laterally from the implement, a spring attached to said arm for normally holding the arm in its position alongside the implement, a draft member, means for pivotally connecting its forward end portion to a wagon advancing means, and means for connecting its rear end portion to a wagon tongue having its forward end resting in said tongue supporting member.

2. A wagon hitch for use in connecting a wagon having a tongue, to an implement to be advanced, comprising a wagon tongue supporting arm having a tongue supporting member at its forward portion, means for pivoting its rear end portion to an implement so that its forward end may move laterally from position substantially parallel with the side of an implement, to position extended laterally from the implement, a draft member, means for pivotally connecting its forward end portion to an implement, and means for connecting its rear end portion to a wagon tongue having its forward end resting in said tongue supporting member.

3. A wagon hitch for use in connecting a wagon having a tongue, to an implement to be advanced, comprising a wagon tongue supporting arm having a tongue supporting member at its forward portion, means for pivoting its rear end portion to an implement so that its forward end may move laterally from position substantially parallel with the side of an implement, to position extended laterally from the implement, a draft member, means for pivotally connecting its forward end portion to an implement, and means for connecting its rear end portion to a wagon tongue having its forward end resting in said tongue supporting member, said draft member having a pivotal joint at a point adjacent the rear end of the implement.

4. The combination of an implement to be advanced over a field, and a wagon having a tongue, of a tongue supporting arm pivoted at its rear end to the rear portion of the implement and extended forwardly alongside the implement and capable of having its forward end swing laterally away from the implement, a tongue supporting bracket at the forward end of said arm, a spring attached to said arm and said implement tending to move the arm toward the side of the implement, a draft member comprising a bar pivoted at its forward end to the implement and extended rearwardly alongside the implement to the rear end portion of the implement and capable of swinging laterally away from the implement at its rear end, and a flexible draft member attached to the rear of said draft bar, and means for attaching it to the rear end portion of a wagon tongue having its forward end resting in said bracket.

DUGALD CURRIE.